United States Patent
Kellner

(10) Patent No.: US 10,885,640 B2
(45) Date of Patent: Jan. 5, 2021

(54) ENHANCED OBJECT DETECTION AND MOTION ESTIMATION FOR A VEHICLE ENVIRONMENT DETECTION SYSTEM

(71) Applicants: Veoneer Sweden AB, Vårgårda (SE); Dominik Kellner, Dachau (DE)

(72) Inventor: Dominik Kellner, Dachau (DE)

(73) Assignee: VEONEER SWEDEN AB, Vårgårda (SE)

( * ) Notice: Subject to any disclaimer, the term of this patent is extended or adjusted under 35 U.S.C. 154(b) by 57 days.

(21) Appl. No.: 16/325,470

(22) PCT Filed: Aug. 18, 2017

(86) PCT No.: PCT/EP2017/070963
§ 371 (c)(1),
(2) Date: Feb. 14, 2019

(87) PCT Pub. No.: WO2018/033636
PCT Pub. Date: Feb. 22, 2018

(65) Prior Publication Data
US 2019/0180451 A1    Jun. 13, 2019

(30) Foreign Application Priority Data
Aug. 19, 2016    (EP) .................................... 16184839

(51) Int. Cl.
*G06T 7/246* (2017.01)
*G06K 9/00* (2006.01)
(Continued)

(52) U.S. Cl.
CPC ............ *G06T 7/246* (2017.01); *G01S 13/589* (2013.01); *G01S 13/931* (2013.01);
(Continued)

(58) Field of Classification Search
CPC ........... G06T 7/246; G06T 7/70; G06T 7/285; G06T 7/593; G06T 7/277; G06T 7/73;
(Continued)

(56) References Cited

U.S. PATENT DOCUMENTS

| 6,862,527 B2 * | 3/2005 | Okamura | ................ G01S 7/414 |
| | | | 701/301 |
| 6,888,622 B2 * | 5/2005 | Shimomura | .......... G01S 13/867 |
| | | | 356/4.01 |

(Continued)

FOREIGN PATENT DOCUMENTS

| DE | 102008025773 A1 * | 1/2009 | ............. G08G 1/166 |
| DE | 102008025773 A1 | 1/2009 | |
| EP | 1531343 A1 | 5/2005 | |

OTHER PUBLICATIONS

Lane-Change Decision Aid System Based on Motion-Driven Vehicle Tracking (Year: 2008).*

(Continued)

*Primary Examiner* — Nizar N Sivji
(74) *Attorney, Agent, or Firm* — Dickinson Wright PLLC

(57) ABSTRACT

A vehicle environment detection system (2) that includes a detection device and a processing unit (5), arranged to detect at least two feature points at objects (11) outside a vehicle (1). Each feature point constitutes a retrievable point that has a fixed position ($x_1$, $y_1$; $x_2$, $y_2$) on the object (11). The processing unit (5) is arranged to determine the positions ($x_1$, $y_1$; $x_2$, $y_2$) and the resulting velocities ($v_{r1}$, $v_{r2}$) for each one of the feature points for multiple frames by use of a feature point tracker; and determine a reference position ($x_0$, $y_0$), a corresponding reference velocity ($v_{r0}$) and reference angular velocity ($\omega$), constituting a common motion state for the object (11), by use of the results from the feature point tracker. A feature point tracker is constituted by a tracking (Continued)

algorithm which is arranged to track multiple features and which includes temporal filtering.

7 Claims, 5 Drawing Sheets

(51) Int. Cl.

| | | |
|---|---|---|
| G06T 7/277 | (2017.01) | |
| G06T 7/73 | (2017.01) | |
| G01S 13/58 | (2006.01) | |
| G01S 13/931 | (2020.01) | |
| G06T 7/70 | (2017.01) | |
| G06T 7/285 | (2017.01) | |
| G06T 7/593 | (2017.01) | |
| G08G 1/16 | (2006.01) | |

(52) U.S. Cl.
CPC .......... *G06K 9/00805* (2013.01); *G06T 7/277* (2017.01); *G06T 7/285* (2017.01); *G06T 7/593* (2017.01); *G06T 7/70* (2017.01); *G06T 7/73* (2017.01); *G01S 2013/9323* (2020.01); *G01S 2013/9324* (2020.01); *G06T 2207/10021* (2013.01); *G06T 2207/10044* (2013.01); *G06T 2207/20164* (2013.01); *G06T 2207/30252* (2013.01); *G06T 2207/30261* (2013.01); *G08G 1/16* (2013.01)

(58) Field of Classification Search
CPC . G06T 2207/10021; G06T 2207/30252; G06T 2207/20164; G06T 2207/10044; G06T 2207/30261; G06K 9/00805; G01S 13/589; G01S 13/931; G01S 2013/9323; G01S 2013/9324; G08G 1/16
See application file for complete search history.

(56) References Cited

U.S. PATENT DOCUMENTS

| | | | | |
|---|---|---|---|---|
| 8,462,988 | B2* | 6/2013 | Boon | G06K 9/00798 382/104 |
| 2010/0283663 | A1* | 11/2010 | Sasabuchi | G01S 13/589 342/70 |
| 2016/0291149 | A1* | 10/2016 | Zeng | B60Q 9/008 |

OTHER PUBLICATIONS

A classification of on-road obstacles according to their relative velocities (Year: 2016).*
Looking at Vehicles on the Road: A Survey of Vision-Based Vehicle Detection, Tracking, and Behavior Analysis (Year: 2013).*
Lateral Vehicle State and Environment Estimation Using Temporally Previewed Mapped Lane Features (Year: 2015).*
Tracking of Moving Objects from a Moving Vehicle Using a Scanning Laser Rangefinder (Year: 2006).*
Vehicle Detection Techniques for Collision Avoidance Systems: A Review (Year: 2006).*
European Patent Office, Rijswijk, Netherlands, International Search Report of International Application No. PCT/EP2017/070963, dated Nov. 30, 2017, 5 pages.

* cited by examiner

ENHANCED OBJECT DETECTION AND MOTION ESTIMATION FOR A VEHICLE ENVIRONMENT DETECTION SYSTEM

TECHNICAL FIELD

The present disclosure relates to a vehicle environment detection system that includes at least one detection device and at least one processing unit. The vehicle environment detection system is arranged to detect at least two feature points at objects outside a vehicle, where each feature point constitutes a retrievable point that has a fixed position on the object.

BACKGROUND

The present disclosure also relates to a vehicle environment detection system that is arranged to obtain the position for each feature point.

Today, vehicle environment detection systems such as for example camera systems, Doppler radar systems and LIDAR systems, may be mounted on a vehicle in order to detect objects in order to implement functions such as speed control and collision prevention, as well as others. For this purpose, it is desired to obtain a common motion state for an extended object.

The document DE 102008025773 relates to estimating a location and movement state of an observed object using stereo image processing. 3D points are tracked using a Kalman filter for the image sequences. Keeping track of 3D points leads to so-called 6D vectors in which a 3D position is combined with a 3D velocity vector. However, the disclosure of DE 102008025773 requires a stereo-camera and a motion model, and also requires a velocity estimation from the sensor. This leads to a relatively large computational effort and a relatively high usage of bandwidth.

There is thus a need for an improved device and method for a vehicle environment detection systems where a common motion state for an extended object is obtained.

SUMMARY OF THE INVENTION

Solutions to the above referenced needs are provided by embodiments of the present invention which include use of a vehicle environment detection system that includes at least one detection device and at least one processing unit. The vehicle environment detection system is arranged to detect at least two feature points at objects outside a vehicle. Each feature point constitutes a retrievable point that has a fixed position on the object. The processing unit is arranged to:

Determine the positions and the resulting velocities for each one of the feature points for multiple frames by use of a feature point tracker.

Determine a reference position, a corresponding reference velocity and reference angular velocity, constituting a common motion state for the object, by use of the results from the feature point tracker.

A feature point tracker is constituted by a tracking algorithm which is arranged to track multiple features and which includes temporal filtering.

This is also achieved by use of a method for determining a common motion state for at least one object outside a vehicle, where the method includes:

Detecting at least two feature points at objects outside a vehicle, where each feature point constitutes a retrievable point that has a fixed position on the object, Determining the positions and resulting velocities for each one of the feature points for multiple frames by use of a feature point tracker.

Determining a reference position, a corresponding reference velocity and reference angular velocity, constituting a common motion state for the object, using the results from the feature point tracker.

A feature point tracker is constituted by a tracking algorithm which is arranged to track multiple features and which includes temporal filtering.

According to an example, the processing unit is arranged to transform the reference velocity vector to desired positions.

According to another example, the vehicle environment detection system is arranged to calculate the common motion state by solving the linear equation system:

$$\begin{bmatrix} v_{x1} \\ v_{y1} \\ v_{x2} \\ v_{y2} \\ \vdots \\ v_{xN} \\ v_{yN} \end{bmatrix} = \begin{bmatrix} -y_1 + y_0 & 1 & 0 \\ x_1 - x_0 & 0 & 1 \\ -y_2 + y_0 & 1 & 0 \\ x_2 - x_0 & 0 & 1 \\ \vdots & & \\ -y_N + y_0 & 1 & 0 \\ x_N - x_0 & 0 & 1 \end{bmatrix} \begin{bmatrix} \omega \\ v_{x0} \\ v_{y0} \end{bmatrix}$$

Here, $v_{x1} \ldots v_{xN}$ are determined velocity x-components for each feature point, $v_{y1} \ldots v_{yN}$ are determined velocity y-components for each feature point, $x_1 \ldots x_N$ is an x-coordinate for each feature point position, $y_1 \ldots y_N$ is a y-coordinate for each feature point position, $v_{x0}$ is a velocity x-component for the reference velocity vector, $v_{y0}$ is a velocity y-component for the reference velocity vector, $x_0$ is a reference position x-coordinate and $y_0$ is a reference position y-coordinate, where all coordinates are determined relative a coordinate system having an x-axis and a y-axis.

This is also achieved by use of a vehicle environment detection system that includes at least one detection device and at least one processing unit. The vehicle environment detection system is arranged to detect at least two feature points at objects outside a vehicle in at least two consecutive frames, where each feature point constitutes a retrievable point that has a fixed position on the object. For each feature point, the vehicle environment detection system is arranged to obtain the position. The processing unit is arranged to:

form a measurement vector from the feature points according to:

$$\begin{bmatrix} \tilde{x}_1 \\ \tilde{y}_1 \\ \tilde{x}_2 \\ \tilde{y}_2 \\ \vdots \\ \tilde{x}_N \\ \tilde{y}_N \end{bmatrix}$$

form a temporal filter state vector according to:

$$\begin{bmatrix} \omega \\ v_{x0} \\ v_{y0} \\ x_1 \\ y_1 \\ x_2 \\ y_2 \\ \vdots \\ x_N \\ y_N \end{bmatrix}$$

form a predicted feature point vector for the update step according to:

$$\begin{bmatrix} \hat{x}_1 \\ \hat{y}_1 \\ \hat{x}_2 \\ \hat{y}_2 \\ \vdots \\ \hat{x}_N \\ \hat{y}_N \end{bmatrix}$$

by use of the temporal filter state vector, where:

$$\begin{bmatrix} \hat{x}_1 \\ \hat{y}_1 \\ \hat{x}_2 \\ \hat{y}_2 \\ \vdots \\ \hat{x}_N \\ \hat{y}_N \end{bmatrix} = \begin{bmatrix} 1 & 0 & 0 & 0 & & \\ 0 & 0 & 1 & 0 & 0 & \\ & 0 & 0 & 1 & 0 & \cdots \\ & 0 & 0 & 0 & 1 & \\ & & \vdots & & & \end{bmatrix} \begin{bmatrix} \hat{\omega} \\ \widehat{v_{x0}} \\ \widehat{v_{y0}} \\ \widehat{x_1} \\ \widehat{y_1} \\ \widehat{x_2} \\ \widehat{y_2} \\ \vdots \\ \widehat{x_N} \\ \widehat{y_N} \end{bmatrix}$$

where $x_1 \ldots x_N$ is an x-coordinate for each feature point position, $y_1 \ldots y_N$ is a y-coordinate for each feature point position, $\hat{x}_1 \ldots \hat{x}_N$ is a predicted x-coordinate for each feature point position, $\hat{y}_1 \ldots \hat{y}_N$ is a predicted y-coordinate for each feature point position, $\tilde{x}_1 \ldots \tilde{x}_N$ is a measured x-coordinate for each feature point position, $\tilde{y}_1 \ldots \tilde{y}_N$ is a measured y-coordinate for each feature point position, $\omega$ is an angular velocity of the target object, $v_{x0}$ is a velocity x-component for a reference velocity vector, $v_{y0}$ is a velocity y-component for the reference velocity vector. All coordinates are determined relative a coordinate system having an x-axis and a y-axis. The processing unit is arranged to form an updated temporal filter state vector by use of the feature point vector and the predicted feature point vector.

This is also achieved by use of a method for determining a common motion state for at least one object outside a vehicle, where the method includes:

Detecting at least two feature points at objects outside a vehicle in at least two consecutive frames, where each feature point constitutes a retrievable point that has a fixed position on the object.

For each feature point, obtaining the position.

Forming a measurement vector from the feature points according to:

$$\begin{bmatrix} \tilde{x}_1 \\ \tilde{y}_1 \\ \tilde{x}_2 \\ \tilde{y}_2 \\ \vdots \\ \tilde{x}_N \\ \tilde{y}_N \end{bmatrix}$$

Forming a temporal filter state vector according to:

$$\begin{bmatrix} \omega \\ v_{x0} \\ v_{y0} \\ x_1 \\ y_1 \\ x_2 \\ y_2 \\ \vdots \\ x_N \\ y_N \end{bmatrix}$$

Forming a predicted feature point vector for the update step according to:

$$\begin{bmatrix} \hat{x}_1 \\ \hat{y}_1 \\ \hat{x}_2 \\ \hat{y}_2 \\ \vdots \\ \hat{x}_N \\ \hat{y}_N \end{bmatrix}$$

by use of the temporal filter state vector, where:

$$\begin{bmatrix} \hat{x}_1 \\ \hat{y}_1 \\ \hat{x}_2 \\ \hat{y}_2 \\ \vdots \\ \hat{x}_N \\ \hat{y}_N \end{bmatrix} = \begin{bmatrix} 1 & 0 & 0 & 0 & & \\ 0 & 0 & 1 & 0 & 0 & \\ & 0 & 0 & 1 & 0 & \cdots \\ & 0 & 0 & 0 & 1 & \\ & & \vdots & & & \end{bmatrix} \begin{bmatrix} \hat{\omega} \\ \widehat{v_{x0}} \\ \widehat{v_{y0}} \\ \widehat{x_1} \\ \widehat{y_1} \\ \widehat{x_2} \\ \widehat{y_2} \\ \vdots \\ \widehat{x_N} \\ \widehat{y_N} \end{bmatrix}$$

Here, $x_1 \ldots x_N$ is an x-coordinate for each feature point position, $y_1 \ldots y_N$ is a y-coordinate for each feature point position, $\hat{x}_1 \ldots \hat{x}_N$ is a predicted x-coordinate for each feature point position, $\hat{y}_1 \ldots \hat{y}_N$ is a predicted y-coordinate for each feature point position, $\tilde{x}_1 \ldots \tilde{x}_N$ is a measured x-coordinate for each feature point position, $\tilde{y}_1 \ldots \tilde{y}_N$ is a measured y-coordinate for each feature point position, $\omega$ is an angular velocity of the target object, $v_{x0}$ is a velocity x-component for a reference velocity vector, and $v_{y0}$ is a velocity y-component for the reference velocity vector. All coordinates are determined relative a coordinate system having an x-axis and a y-axis. The processing unit is arranged to form an updated temporal filter state vector by use of the feature point vector and the predicted feature point vector.

According to an example, the processing unit is arranged to exclude feature positions that are determined to move relative to the object from the temporal filter update vector.

Other examples are disclosed in the dependent claims.

A number of advantages are obtained by use of the present disclosure. Mainly, a direct calculation of a complete two-dimensional motion state of an extended object is obtained without any model assumptions. The solution is acquired directly in a linear equation system.

BRIEF DESCRIPTION OF THE DRAWINGS

The present disclosure will now be described more in detail with reference to the appended drawings, where.

DETAILED DESCRIPTION OF EMBODIMENTS OF THE INVENTION

Figure 1:
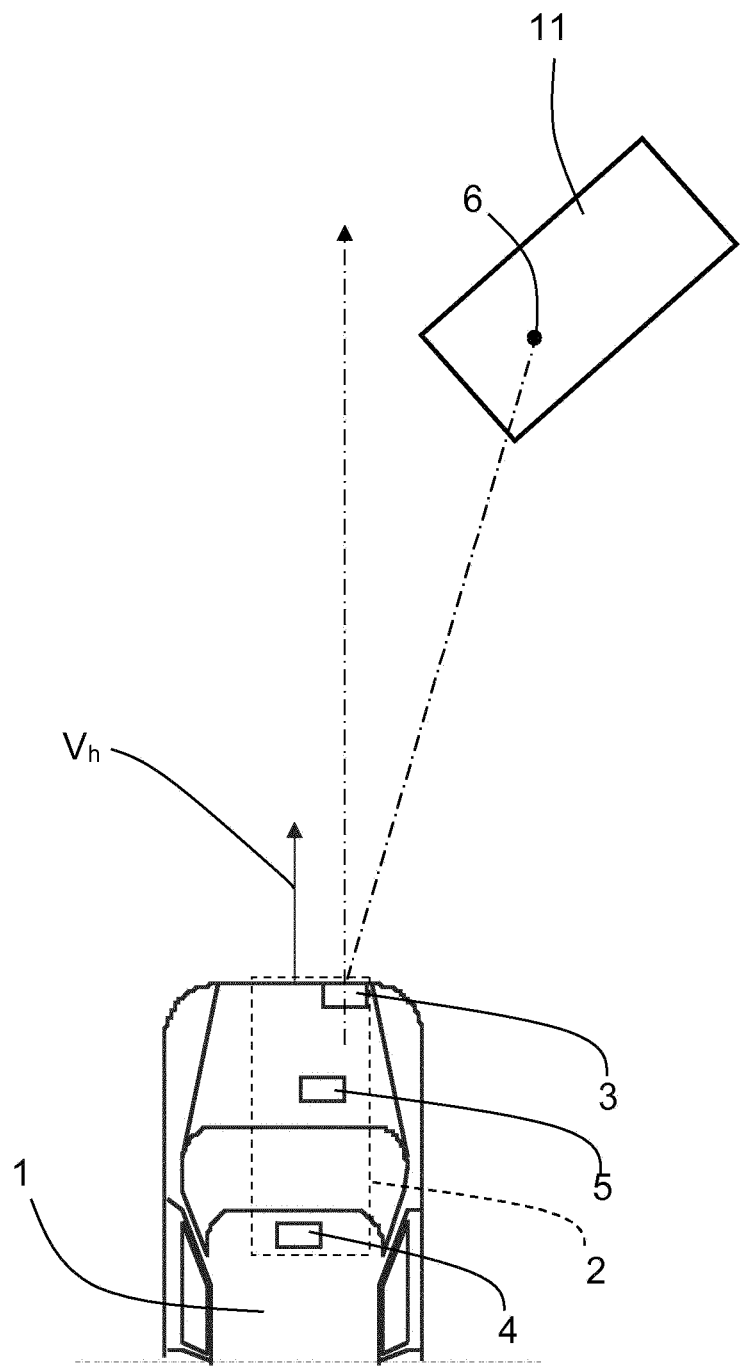
FIG. 1 shows a schematic top view of a vehicle with a vehicle environment detection system according to a first example.

With reference to FIG. 1, showing a first example, a host vehicle 1 includes a vehicle environment detection system 2 that in turn includes a radar sensor arrangement 3 and a camera device 4 and a processing unit 5. The host vehicle 1 is moving with a certain host vehicle velocity $v_h$, and there is a target object 11 present in the vicinity of the vehicle's path, where the target object 11 is detected at a detection 6 by the vehicle environment detection system 2.

Figure 2:
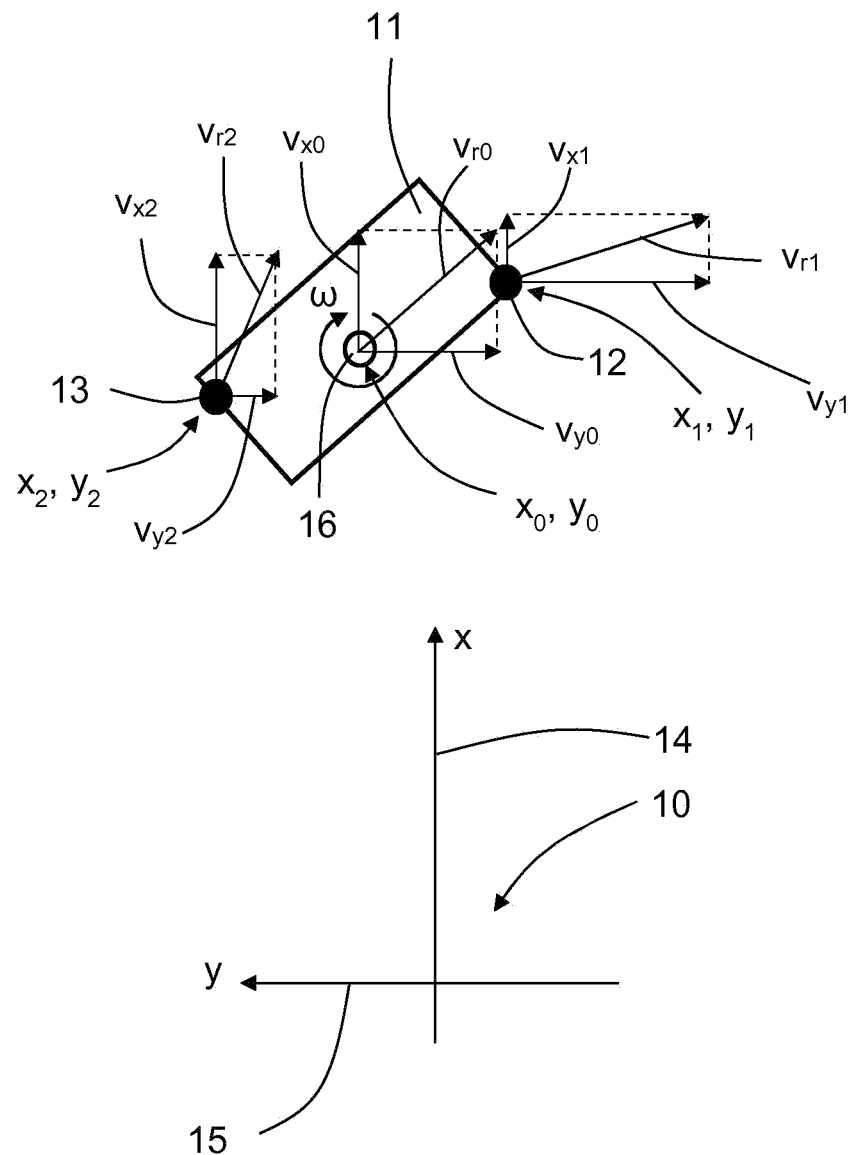
FIG. 2 shows a first schematic top view of a vehicle environment detection system according to a second example.

With reference to FIG. 2, a more schematical view is presented where there is a target object 11, such as another vehicle, that according to a first example is detected at two different detections 12, 13 by the vehicle environment detection system 2 and therefore constitutes an extended object. Each detection 12, 13 constitutes a feature point, where a feature point is a retrievable point, which has a fixed position on the extended object 11. It could be a geometric point, e.g. front-left corner or front-right corner, or a special point, e.g. wheels that are detected by a Doppler radar or special texture that is detected by a stereo camera etc.

A first feature point 12 has a first position $x_1$, $y_1$ and also has a first resulting velocity $v_{r1}$ that includes a first velocity x-component $v_{x1}$ and a first velocity y-component $v_{y1}$. Correspondingly, a second feature point 13 has a second position $x_2$, $y_2$ and also has a second resulting velocity $v_{r2}$ that includes a second velocity x-component $v_{x2}$ and a second velocity y-component $v_{y2}$.

There is also a reference position 16 at a reference position x-coordinate $x_0$ and a reference position y-coordinate $y_0$, having a reference velocity $v_{r0}$ that includes a reference velocity x-component $v_{x0}$ and a reference velocity y-component $v_{y0}$, where $\omega$ is an angular velocity of the target object, which angular velocity $\omega$ is independent of the reference point's position.

All positions are determined relative a coordinate system 10 having an x-axis 14 and a y-axis 15.

The reference position $x_0$, $y_0$ can be chosen arbitrarily, e.g. center of mass of all tracks or origin of the coordinate system 10. Generally, any reference point 16 at any reference position $x_0$, $y_0$ can be used since the reference velocity vector $v_{r0}$ can be transformed to any position. Knowing the motion state of a rigid body, such as the extended object 11, a velocity vector can be calculated at an arbitrary position on the extended object 11; the angular velocity $\omega$, the yaw rate, is independent of the position.

Further the velocity vector at an arbitrary reference point position, even outside the object, here called virtual velocity, can be determined, e.g. in the origin of the ego coordinate system. This is discussed in a following second example. If the motion state is determined at this position, it can be transformed back on an arbitrary position on the vehicle as illustrated with equation (0) below:

$$\begin{bmatrix} v_{x1} \\ v_{y1} \end{bmatrix} = \begin{bmatrix} -y_1 & 1 & 0 \\ x_1 & 0 & 1 \end{bmatrix} \begin{bmatrix} \omega \\ v_{x0} \\ v_{y0} \end{bmatrix} \quad (0)$$

According to the present disclosure, the vehicle environment detection system 2 is arranged to detect at least two feature points 12, 13 using the radar sensor arrangement 3 and/or the camera device 4. Each feature point 12, 13 is tracked and followed over multiple frames, using a feature point tracker.

A feature point tracker is generally constituted by a tracking algorithm which is arranged to track multiple features, e.g. corners, closest point, left-most etc., on an extended object. Such a tracking algorithm has a certain model for expected measurements and for motion behavior, and includes temporal filtering; according to some aspects by using a classical Kalman-filter. It has different states, e.g. position, velocity and acceleration, for each feature point and is arranged to calculate these states using measurements. Generally, a tracker can contain multiple tracks, where each track corresponds to an instant of the model.

In this way, the positions $x_1$, $y_1$, $x_1$, $y_1$ and the resulting velocities $v_{r1}$, $v_{r1}$ of the feature points 12, 13 are determined for multiple frames, and then these results are used for determining the reference velocity $v_{r0}$ and angular velocity $\omega$, constituting a common motion state for the extended object 11. The reference point is either a fixed point, e.g. center of a coordinate system, or is calculated from the feature points, e.g. mean value of positions.

A feature point tracker works independently on a feature point and after the update, a common motion state for the extended object is calculated.

For this purpose, the following two equation systems are formulated as:

$$\begin{bmatrix} v_{x1} \\ v_{y1} \end{bmatrix} = \begin{bmatrix} -y_1 + y_0 & 1 & 0 \\ x_1 - x_0 & 0 & 1 \end{bmatrix} \begin{bmatrix} \omega \\ v_{x0} \\ v_{y0} \end{bmatrix} \text{ and} \quad (1)$$

$$\begin{bmatrix} v_{x2} \\ v_{y2} \end{bmatrix} = \begin{bmatrix} -y_2 + y_0 & 1 & 0 \\ x_2 - x_0 & 0 & 1 \end{bmatrix} \begin{bmatrix} \omega \\ v_{x0} \\ v_{y0} \end{bmatrix} \quad (2)$$

Equation (1) and equation (2) are now combined to a linear equation system for N feature points:

$$\begin{bmatrix} v_{x1} \\ v_{y1} \\ v_{x2} \\ v_{y2} \\ \vdots \\ v_{xN} \\ v_{yN} \end{bmatrix} = \begin{bmatrix} -y_1 + y_0 & 1 & 0 \\ x_1 - x_0 & 0 & 1 \\ -y_2 + y_0 & 1 & 0 \\ x_2 - x_0 & 0 & 1 \\ \vdots & & \\ -y_N + y_0 & 1 & 0 \\ x_N - x_0 & 0 & 1 \end{bmatrix} \begin{bmatrix} \omega_0 \\ v_{x0} \\ v_{y0} \end{bmatrix} \quad (3)$$

Each track of the feature point tracker tracks a single feature and has a position and velocity state, and this is the input of the motion state estimation in equation (3) above. Using a minimum of two feature points, three motion parameters can be estimated. By adding additional equations from more feature point tracks, the accuracy and robustness is increased. Three equations is sufficient for determining three motion parameters, but two feature points are needed and each feature point has two equations; therefore four equations are needed in practice.

In order to solve the linear equation system (3), a Least-Squares-Solution may be used, where the three motion parameters can be estimated out of an arbitrary number of equations, however three or more equations are required according to the above.

According to some aspects, weighted Least-Squares may be used, where the equations are weighted according to a covariance matrix of each feature point track, where a feature point track with a more accurate velocity vector is conferred a higher weight factor.

According to some aspects, orthogonal distance regression may be used, and does not only include weights of velocity vector, but also position uncertainty from each feature point track.

According to some aspects, for added robustness, a RANSAC (Random sample consensus) robust Least-Squares approach is used. Here, feature point tracks which have a wrong motion states are excluded by finding a group of feature point tracks which have a common motion state. This use that if, for example, a wrong wheel is associated with a certain feature point track, which feature point track moves on the extended object target vehicle and has a wrong velocity vector, that certain feature point track is automatically excluded by RANSAC.

According to some aspects, the sampling covariance estimation of the linear equation system (3) is calculated.

The velocity vector for each feature point track is calculated and, according to some aspects, knowing the motion state, the velocity vector of each feature point track can be re-estimated. The calculated common motion state for the extended object is an average motion state that can be used to correct all feature point tracks.

For example, two features points 11, 12 of the extended object 11 are used for estimating the position and velocity vector of the extended object 11 using a feature point tracker, for example a Kalman filter. By use of that information, the common motion state of the extended object 11 is calculated by combining them, for example by using an average calculation or least-squares calculation. Using the acquired motion state, expected velocity vectors for the features points 11, 12 can be calculated. This means that, according to some aspects, a common motion state is calculated using a number of feature point tracks, and the acquired common motion state is then used to correct all of the feature point tracks.

A complete motion state can thus be estimated, including yaw rate, where the velocity vector of an arbitrary point can be estimated using equations (1) and (2). Feature point trackers, which for example includes uncomplicated linear Kalman filters, can be stabilized by combining them.

The feature points 12, 13 can be detected by any suitable detection device in the vehicle environment detection system 2, for example the radar sensor arrangement 3 and/or the camera device 4. Other detection arrangements are conceivable to be used in the vehicle environment detection system 2, for example LIDAR (Light detection and ranging), ultrasonic sensors, time-of-flight cameras (ToF-camera), infrared cameras etc. For this purpose, generally, the environment detection system 2 includes at least one detection device 3, 4.

A relatively small computation effort is needed since the linear equation system (3) is relatively small. An arbitrary number of features point tracks, at least two, from different sensors can be used, which provides an increased accuracy and robustness.

In addition, feature point trackers can also be arranged for an acceleration state.

Figure 3:
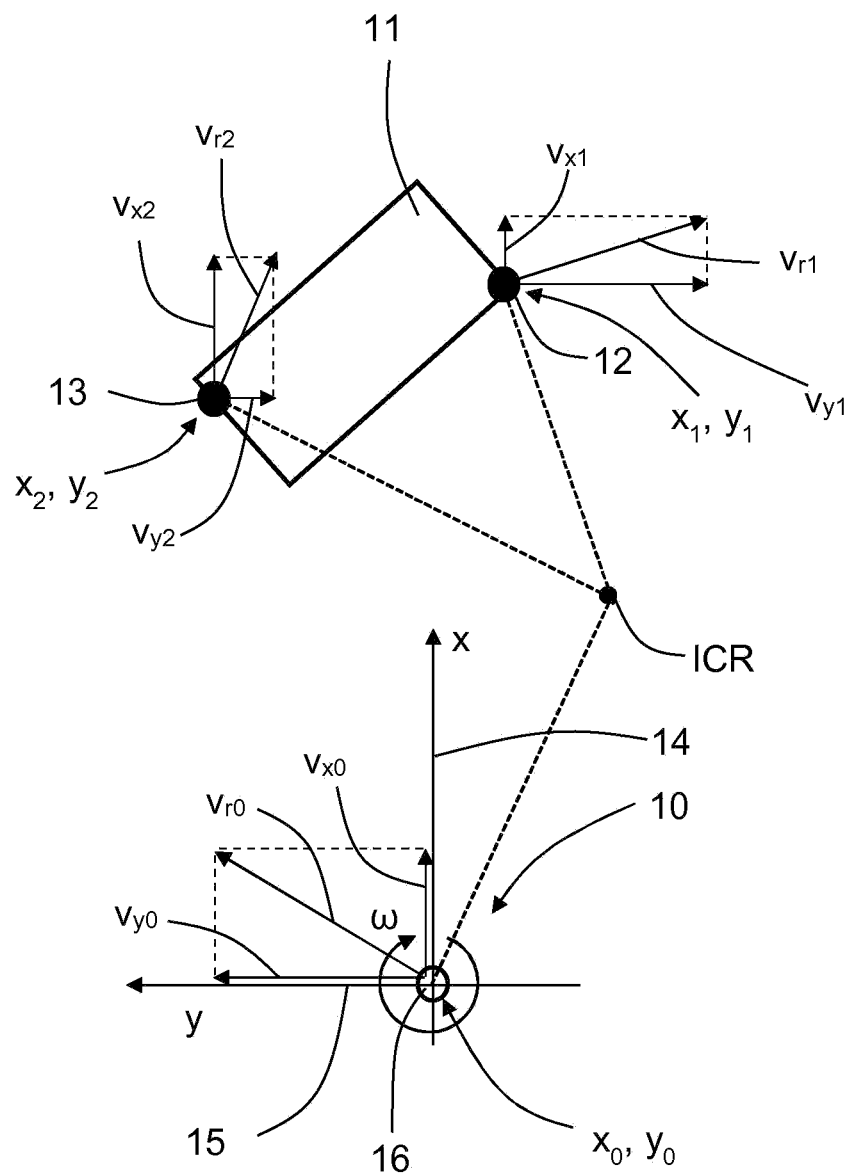
FIG. 3 shows a second schematic top view of a vehicle environment detection system according to a second example.

According to a second example, with reference to FIG. 3, a single tracker, constituted by a tracking algorithm, for an extended object 11 is used, where the tracker is updated by measurements of at least two different features points from a single sensor, or multiple sensors. These feature points are detected in at least two consecutive frames.

In the following, the sign $\sim$ designates measurements results, and the sign $\wedge$ designates predictions.

Measurements provide available feature points 12, 13, below a general measured feature point vector is shown, having N measured feature points:

$$\begin{bmatrix} \tilde{x}_1 \\ \tilde{y}_1 \\ \tilde{x}_2 \\ \tilde{y}_2 \\ \vdots \\ \tilde{x}_N \\ \tilde{y}_N \end{bmatrix} \quad (4)$$

An unscented Kalman Filter state vector containing parameters $\omega$, $v_{x0}$, $v_{y0}$ of the full motion state of the extended object and available feature points is shown below:

$$\begin{bmatrix} \omega \\ v_{x0} \\ v_{y0} \\ x_1 \\ y_1 \\ x_2 \\ y_2 \\ \vdots \\ x_N \\ y_N \end{bmatrix} \quad (5)$$

In the following, prediction of the Kalman Filter state vector (5) according to some aspects will be described more in detail.

Generally, the Kalman Filter state vector is constituted by a temporal filter state vector, since any kind of temporal filtering is conceivable, the Kalman filter only being an example.

Prediction to a next step of a non-linear, i.e. extended or unscented, Kalman filter with an assumed constant instant center of rotation ICR brings a constant velocity and constant yaw rate by approximation of the movement by use of a linear vector. This leads to the following expressions (6):

$$\left. \begin{aligned} \hat{\omega} &= \omega \\ \widehat{v_{x0}} &= v_{x0} \\ \widehat{v_{y0}} &= v_{y0} \\ \hat{x}_1 &= x_1 + \left( \frac{v_{x1}}{\omega} \sin(\omega \Delta t) - \frac{v_{y1}}{\omega} (1 - \cos(\omega \Delta t)) \right) \\ \hat{y}_1 &= y_1 + \left( \frac{v_{y1}}{\omega} \sin(\omega \Delta t) + \frac{v_{x1}}{\omega} (1 - \cos(\omega \Delta t)) \right) \\ &\text{with:} \\ v_{x1} &= -y_1 \omega + v_{x0} \\ v_{y1} &= x_1 \omega + v_{y0} \end{aligned} \right\} \quad (6)$$

If the angular velocity ω is close to zero, the expressions (6) cannot be used, since that will lead to a division by zero, therefore a linear version is used. In this case, the position of the instant center of rotation ICR is positioned in infinity, enabling all measurements and the reference point to have the same velocity vector. This leads to the following expressions (7):

$$\left. \begin{aligned} \hat{\omega} &= \omega \\ \widehat{v_{x0}} &= v_{x0} \\ \widehat{v_{y0}} &= v_{y0} \\ \hat{x}_1 &= x_1 + v_x \Delta t \\ \hat{y}_1 &= y_1 + v_y \Delta t \end{aligned} \right\} \quad (7)$$

According to some aspects, the reference point can be replaced before the prediction, for example from the reference point in FIG. 3 to the reference point in FIG. 2. The motion state $v_{xR}$ and $v_{yR}$ has to be compensated by using the equations (1) and (2) between the old reference point and the new reference point. The reference point is not part of the state vector, but the velocity vector refers to this point.

The Kalman Filter state vector (5) is used for an update step for available feature points which are already in Kalman Filter state, which use that they have been available from previous measurements, resulting in a predicted feature point vector out of the states for the update step; ^ indicates the predicted states at k+1:

$$\begin{bmatrix} \hat{x}_1 \\ \hat{y}_1 \\ \hat{x}_2 \\ \hat{y}_2 \\ \vdots \\ \hat{x}_N \\ \hat{y}_N \end{bmatrix}, \quad (8)$$

where the expected measured feature point vector is calculated out of the predicted state according to:

$$\begin{bmatrix} \hat{x}_1 \\ \hat{y}_1 \\ \hat{x}_2 \\ \hat{y}_2 \\ \vdots \\ \hat{x}_N \\ \hat{y}_N \end{bmatrix} = \begin{bmatrix} 1 & 0 & 0 & 0 & & \\ 0 & 0 & 1 & 0 & 0 & \\ 0 & 0 & 1 & 0 & \cdots & \cdots \\ 0 & 0 & 0 & 1 & & \\ & & \vdots & & & \\ & & \vdots & & & \end{bmatrix} \begin{bmatrix} \hat{\omega} \\ \widehat{v_{x0}} \\ \widehat{v_{y0}} \\ \widehat{x_1} \\ \widehat{y_1} \\ \widehat{x_2} \\ \widehat{y_2} \\ \vdots \\ \widehat{x_N} \\ \widehat{y_N} \end{bmatrix}. \quad (9)$$

The feature point vector (4) and the predicted feature point vector (6) are used for a Kalman Filter update that is used for update the Kalman Filter state vector (5). If new feature points are available, they are included in the Kalman Filter; its state dimension increases with two for each new feature point.

Due to an erroneous feature association, feature positions may move relative to the target vehicle. According to some aspects, these outlier features should be excluded in the Kalman Filter update, where an example of a suitable approach is described below.

For all measurements a measurement residuum $\tilde{y}_k$ is calculated and the so-called Mahalanobis distance d is calculated according to $$d(\underline{x},\underline{y}) = \sqrt{(\underline{x}-\underline{y})^T S^{-1} (\underline{x}-\underline{y})} \quad (10)$$

Using the x- and y position of each feature and the corresponding innovation covariance, equation (8) is written in matrix form as:

$$d_1^2 = \begin{bmatrix} x_1 - \widehat{x_1} \\ y_1 - \widehat{y_1} \end{bmatrix}^T S_{(x1,y1)}^{-1} \begin{bmatrix} x_1 - \widehat{x_1} \\ y_1 - \widehat{y_1} \end{bmatrix}. \quad (11)$$

All features which a higher Mahalanobis distance d than a certain threshold, such as for example 3a, are excluded. In addition to the position, the velocity vector can be integrated optionally.

Since the angular velocity ω, the yaw rate, is part of the filter, a more stable estimation is acquired. Furthermore, direct incorporation of all measurements in a common filter provides an enhanced performance, using an unscented Kalman filter/extended Kalman filter, resulting in a non-linear equation system.

In the following, an extension is described for scenarios, where mainly linear motion is present, i.e. ω is approximately 0. In the state vector (5), the yaw rate can then be excluded. The velocity vector is then independent of the reference point, for example in equation (0) when ω=0. This use that no reference point has to be specified, which has the effect that during update, only equation (7) is used. Equation (7) is linear which has the effect that e.g. a linear Kalman Filter can be used. Further, the accuracy increases, since instead of the three motion states $v_{0,x}$, $v_{0,y}$ and ω of the extended object, only the two parameters $v_x$ and $v_y$ have to be determined).

Figure 4:
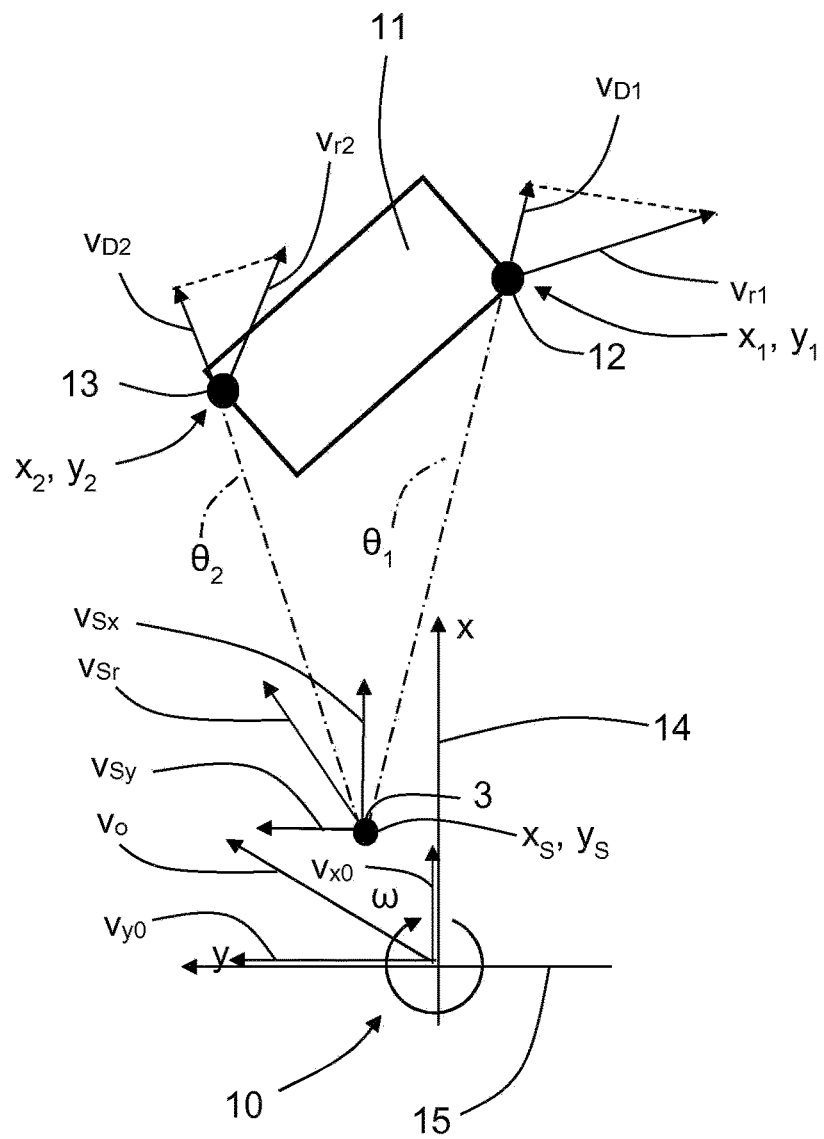
FIG. 4 shows a second schematic top view of a vehicle environment detection system according to an extension of the previous examples.

In the following, a further extension of the above will be described with reference to FIG. 4 that shows the position $x_S$, $y_S$ of a radar sensor arrangement 3 in the coordinate system 10, where the detections 12, 13 are constituted by radar detections. Doppler measurements using the radar sensor arrangement 3 provides radial detected Doppler velocity components for the detection positions 12, 13; for the first detection 12 there is a first detected Doppler velocity component $v_{D1}$ with a first detected azimuth detection angle $\theta_1$, and for the second detection 13 there is a second detected Doppler velocity component $v_{D2}$ with a second detected azimuth detection angle $\theta_2$. The azimuth detection angles $\theta_1$, $\theta_2$ are only schematically indicated for a corresponding line of direction in FIG. 4. The virtual velocity vector $v_{Sr}$ of the object 11 at the sensor position $x_S$, $y_S$ is shown, where the velocity vector $v_{Sr}$ has one x-component $v_{Sx}$ and one y-component $v_{Sy}$].

Assuming an arbitrary number N of radar detections, a general expression is formulated according to:

$$\begin{bmatrix} v_{D1} \\ \vdots \\ v_{DN} \end{bmatrix} = \begin{bmatrix} \cos(\theta_1) & \sin(\theta_1) \\ \vdots & \vdots \\ \cos(\theta_N) & \sin(\theta_N) \end{bmatrix} \begin{bmatrix} v_{xS} \\ v_{yS} \end{bmatrix}. \quad (12)$$

By solving the linear equation system (12), the "virtual" velocity $v_{Sr}$ of the target object at the sensor position can be calculated. The velocity vector $v_{Sr}$ can be used to improve the estimated velocity $v_{r0}$ and angular velocity ω in the first example. Furthermore, the velocity vector $v_{Sr}$ can be integrated in the measured feature point vector (4) in the second example to improve the accuracy of the filtering approach.

For the first example, adding the measurement equation (12) to equation (3) yields:

$$\begin{bmatrix} v_{x1} \\ v_{y1} \\ v_{x2} \\ v_{y2} \\ \vdots \\ v_{xN} \\ v_{yN} \\ v_{Sx1} \\ v_{Sy1} \end{bmatrix} = \begin{bmatrix} -y_1 + y_0 & 1 & 0 \\ x_1 - x_0 & 0 & 1 \\ -y_2 + y_0 & 1 & 0 \\ x_2 - x_0 & 0 & 1 \\ \vdots & & \\ -y_N + y_0 & 1 & 0 \\ x_N - x_0 & 0 & 1 \\ -y_S + y_0 & 1 & 0 \\ x_S - x_0 & 0 & 1 \end{bmatrix} \begin{bmatrix} \omega \\ v_{x0} \\ v_{y0} \end{bmatrix}. \quad (13)$$

This means that by use of a minimum of three equations, three motion parameters can be estimated.

According to some aspects, for the second example, measurements of velocity profile from one radar sensor arrangement Si to a plurality of M radars sensors SM will bring:

$$\begin{bmatrix} v_{Sx1} \\ v_{Sy1} \\ \vdots \\ v_{SxM} \\ v_{SyM} \end{bmatrix}. \quad (14)$$

The measurement vector (14) may be integrated in the Kalman Filter update vector (6) that is used for updating the Kalman Filter state vector (5). This will result in an expected measurement vector 15 according to:

$$\begin{bmatrix} \widehat{v_{Sx1}} \\ \widehat{v_{Sy1}} \\ \hat{x}_1 \\ \hat{y}_1 \\ \hat{x}_2 \\ \hat{y}_2 \\ \vdots \\ \hat{x}_N \\ \hat{y}_N \end{bmatrix}, \quad (15)$$

This vector (15) can be calculated according to:

$$\begin{bmatrix} \widehat{v_{Sx}} \\ \widehat{v_{Sy}} \\ \hat{x}_1 \\ \hat{y}_1 \\ \hat{x}_2 \\ \hat{y}_2 \\ \vdots \\ \hat{x}_N \\ \hat{y}_N \end{bmatrix} = \begin{bmatrix} -y_S & 1 & 0 & 0 & 0 & & \\ x_S & 0 & 1 & 0 & 0 & & \\ 0 & 0 & 0 & 1 & 0 & \cdots & \cdots \\ 0 & 0 & 0 & 0 & 1 & & \\ 0 & & \vdots & & & & \\ 0 & & \vdots & & & & \end{bmatrix} \begin{bmatrix} \hat{\omega} \\ \widehat{v_{x0}} \\ \widehat{v_{y0}} \\ \widehat{x_1} \\ \widehat{y_1} \\ \widehat{x_2} \\ \widehat{y_2} \\ \vdots \\ \widehat{x_N} \\ \widehat{y_N} \end{bmatrix}, \quad (16)$$

instead of equation (9).

This provides a higher degree of accuracy due to Doppler information of a single radar sensor arrangement or multiple radar sensor arrangements. A direct update of the motion state by the velocity profile is enabled, such that multiple sensors can update the motion state independently. The Doppler information is incorporated directly, which is completely decoupled of the object position.

The camera device 5 may be provided in the form of a mono camera or a stereo camera, where a stereo camera provides a scene flow with depth information. An arbitrary number of camera devices and radar systems may of course be used and simply added to the equations (15) and (16). There may be one radar system with a plurality of radar sensor arrangements.

Figure 5:
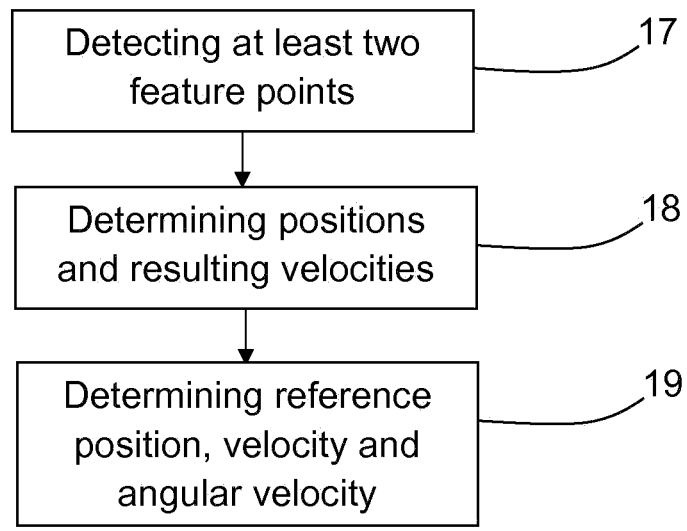
FIG. 5 shows a flowchart for a method according to the present disclosure.

With reference to FIG. 5, the present disclosure also relates to a method for determining a common motion state for at least one object 11 outside a vehicle 1, where the method includes the steps of:

Step 17: Detecting at least two feature points 12, 13 at objects 11 outside a vehicle 1, where each feature point constitutes a retrievable point that has a fixed position on the object 11.

Step 18: Determining the positions $x_1$, $y_1$; $x_2$, $y_2$ and the resulting velocities $v_{r1}$, $v_{r2}$ for each one of the feature points 12, 13 for multiple frames by use of a feature point tracker.

Step 19: Determining a reference position $x_0$, $y_0$, a corresponding reference velocity $v_{r0}$ and reference angular velocity $\omega$, constituting a common motion state for the object 11, using the results from the feature point tracker.

A feature point tracker is constituted by a tracking algorithm which is arranged to track multiple features and which comprises temporal filtering.

Figure 6:
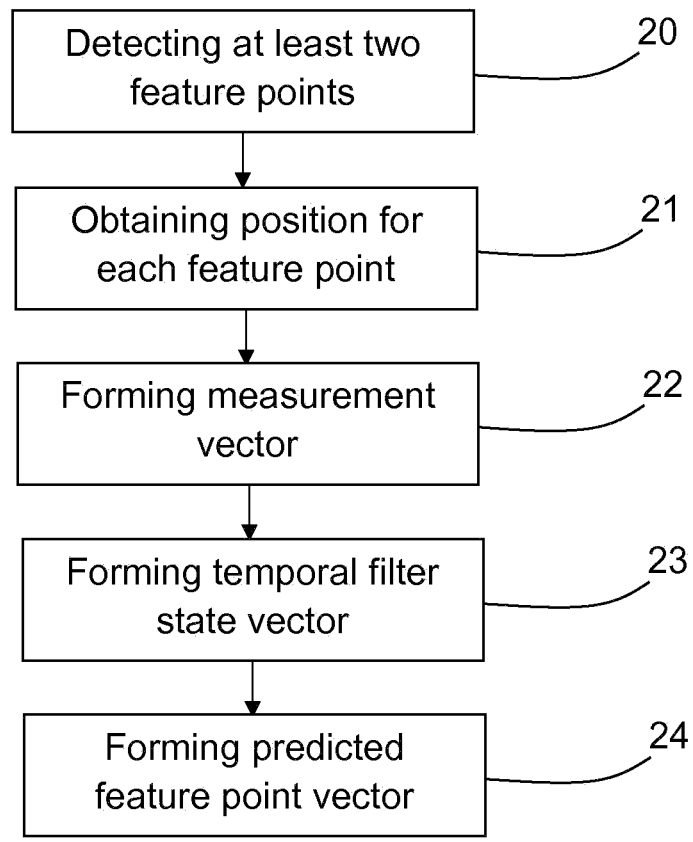
FIG. 6 shows a flowchart for a method according to the present disclosure.

With reference to FIG. 6, the present disclosure also relates to a method for determining a common motion state for at least one object 11 outside a vehicle 1, where the method includes the steps of:

Step 20: Detecting at least two feature points 12, 13 at objects 11 outside a vehicle 1, where each feature point constitutes a retrievable point that has a fixed position $x_1$, $y_1$; $x_2$, $y_2$ on the object 11.

Step 21: For each feature point 12, 13, obtaining the position $x_1$, $y_1$; $x_2$, $y_2$.

Step 22: Forming a measurement vector from the feature points according to:

$$\begin{bmatrix} \tilde{x}_1 \\ \tilde{y}_1 \\ \tilde{x}_2 \\ \tilde{y}_2 \\ \vdots \\ \tilde{x}_N \\ \tilde{y}_N \end{bmatrix}$$

Step 23: Forming a temporal filter state vector according to:

$$\begin{bmatrix} \omega \\ v_{x0} \\ v_{y0} \\ x_1 \\ y_1 \\ x_2 \\ y_2 \\ \vdots \\ x_N \\ y_N \end{bmatrix}$$

and

Step 24: Forming a predicted feature point vector for the update step according to:

$$\begin{bmatrix} \hat{x}_1 \\ \hat{y}_1 \\ \hat{x}_2 \\ \hat{y}_2 \\ \vdots \\ \hat{x}_N \\ \hat{y}_N \end{bmatrix}$$

by use of the temporal filter state vector, where:

$$\begin{bmatrix} \hat{x}_1 \\ \hat{y}_1 \\ \hat{x}_2 \\ \hat{y}_2 \\ \vdots \\ \hat{x}_N \\ \hat{y}_N \end{bmatrix} = \begin{bmatrix} 1 & 0 & 0 & 0 & & \\ 0 & 0 & 1 & 0 & 0 & \\ 0 & 0 & 1 & 0 & \cdots & \cdots \\ 0 & 0 & 0 & 1 & & \\ & & \vdots & & & \\ & & \vdots & & & \end{bmatrix} \begin{bmatrix} \hat{\omega} \\ \hat{v}_{x0} \\ \hat{v}_{y0} \\ \hat{x}_1 \\ \hat{y}_1 \\ \hat{x}_2 \\ \hat{y}_2 \\ \vdots \\ \hat{x}_N \\ \hat{y}_N \end{bmatrix}$$

where $x_1 \ldots x_N$ is an x-coordinate for each feature point position, $y_1 \ldots y_N$ is a y-coordinate for each feature point position, $\hat{x}_1 \ldots \hat{x}_N$ is a predicted x-coordinate for each feature point position, $\hat{y}_1 \ldots \hat{y}_N$ is a predicted y-coordinate for each feature point position, $\tilde{x}_1 \ldots \tilde{x}_N$ is a measured x-coordinate for each feature point position, $\tilde{y}_1 \ldots \tilde{y}_N$ is a measured y-coordinate for each feature point position, $\omega$ is an angular velocity of the target object, $v_{x0}$ is a velocity x-component for a reference velocity vector $v_{r0}$, and $v_{y0}$ is a velocity y-component for the reference velocity vector $v_{r0}$. All coordinates are determined relative a coordinate system 10 having an x-axis 14 and a y-axis 15. An updated temporal filter state vector is formed using the feature point vector and the predicted feature point vector.

The present disclosure is not limited to the examples above, but may vary freely within the scope of the described embodiments. For example, the microwave parts of the radar sensor arrangement 3 are assumed to be of a previously known design, and the radar sensor arrangement 3 includes more parts than shown, for example a radar transmitter, a radar receiver and a receiving antenna array. The radar sensor arrangement 3 may furthermore include a number of other parts, and is for example connected to a warning and/or information device comprised in the vehicle 1 in a previously known manner.

The calculations and determining procedures are performed by the processing unit 5, where the processing unit 5 should be regarded as a processing unit arrangement that is in the form of one unit or several units that either co-operate or handle different tasks more or less independently. In the case of several units, these may be placed adjacent to each other, or in a distributed manner.

All details given in the example are of course only given as an illustration of the present disclosure, and should not be regarded as limiting in any way.

In this context, a frame suitably relates to a group of a number of radar signals, or a group of radar signals.

Generally, the present disclosure relates to a vehicle environment detection system 2 that includes at least one detection device 3, 4 and at least one processing unit 5, where the vehicle environment detection system 2 is arranged to detect at least two feature points 12, 13 at objects 11 outside a vehicle 1, where each feature point constitutes a retrievable point that has a fixed position $x_1$, $y_1$; $x_2$, $y_2$ on the object 11. The processing unit 5 is arranged to:

determine the positions $x_1$, $y_1$; $x_2$, $y_2$ and the resulting velocities $v_{r1}$, $v_{r2}$ for each one of the feature points 12, 13 for multiple frames by use of a feature point tracker; and determine a reference position $x_0$, $y_0$, a corresponding reference velocity $v_{r0}$ and reference angular velocity $\omega$, constituting a common motion state for the object 11, by use of the results from the feature point tracker;

where a feature point tracker is constituted by a tracking algorithm which is arranged to track multiple features and which includes temporal filtering.

According to an example, the feature point tracker includes a Kalman filter.

According to an example, the processing unit 5 is arranged to transform the reference velocity vector $v_{r0}$ to desired positions.

According to an example, the processing unit 5 is arranged to transform the reference velocity vector $v_{r0}$ to the positions of the feature points 12, 13, and to correct the determined resulting velocities $v_{r1}$, $v_{r2}$ of the feature points 12, 13.

According to an example, the vehicle environment detection system 2 is arranged to calculate the common motion state by solving the linear equation system:

$$\begin{bmatrix} v_{x1} \\ v_{y1} \\ v_{x2} \\ v_{y2} \\ \vdots \\ v_{xN} \\ v_{yN} \end{bmatrix} = \begin{bmatrix} -y_1 + y_0 & 1 & 0 \\ x_1 - x_0 & 0 & 1 \\ -y_2 + y_0 & 1 & 0 \\ x_2 - x_0 & 0 & 1 \\ \vdots & & \\ -y_N + y_0 & 1 & 0 \\ x_N - x_0 & 0 & 1 \end{bmatrix} \begin{bmatrix} \omega \\ v_{x0} \\ v_{y0} \end{bmatrix}$$

where $v_{x1} \ldots v_{xN}$ are determined velocity x-components for each feature point 12, 13, $v_{y1} \ldots v_{yN}$ are determined velocity y-components for each feature point 12, 13, $x_1 \ldots x_N$ is an x-coordinate for each feature point position, $y_1 \ldots y_N$ is a y-coordinate for each feature point position, $v_{x0}$ is a velocity x-component for the reference velocity vector $v_{r0}$, $v_{y0}$ is a velocity y-component for the reference velocity vector $v_{r0}$, $x_0$ is a reference position x-coordinate and $y_0$ is a reference position y-coordinate, where all coordinates are determined relative a coordinate system 10 having an x-axis 14 and a y-axis 15.

According to an example, the vehicle environment detection system 2 includes a radar sensor arrangement 3 that is arranged to provide radial detected Doppler velocity components $v_{D1}$, $v_{D2}$ and corresponding azimuth detection angles $\theta_1$, $\theta_2$, where the processing unit 5 is arranged to calculate a velocity vector $v_{Sr}$ of the object 11 at the radar sensor arrangement position $x_S$, $y_S$ by use of the detected Doppler velocity components $v_{D1}$, $v_{D2}$ and corresponding azimuth detection angles $\theta_1$, $\theta_2$, where the processing unit 5 is arranged to apply the velocity vector $v_{Sr}$ to the linear equation system such that the calculation accuracy of the velocity vector $v_{r0}$ and yaw rate $\omega$ is improved.

Generally, the present disclosure also relates to a vehicle environment detection system 2 that includes at least one detection device 3, 4 and at least one processing unit 5, where the vehicle environment detection system 2 is arranged to detect at least two feature points 12, 13 at objects 11 outside a vehicle 1 in at least two consecutive frames, where each feature point constitutes a retrievable point that has a fixed position $x_1$, $y_1$; $x_2$, $y_2$ on the object 11, where, for each feature point 12, 13, the vehicle environment detection system 2 is arranged to obtain the position $x_1$, $y_1$; $x_2$, $y_2$. The processing unit 5 is arranged to:

form a measurement vector from the feature points according to:

$$\begin{bmatrix} \tilde{x}_1 \\ \tilde{y}_1 \\ \tilde{x}_2 \\ \tilde{y}_2 \\ \vdots \\ \tilde{x}_N \\ \tilde{y}_N \end{bmatrix}$$

form a temporal filter state vector according to:

$$\begin{bmatrix} \omega \\ v_{x0} \\ v_{y0} \\ x_1 \\ y_1 \\ x_2 \\ y_2 \\ \vdots \\ x_N \\ y_N \end{bmatrix}$$

form a predicted feature point vector for the update step according to:

$$\begin{bmatrix} \hat{x}_1 \\ \hat{y}_1 \\ \hat{x}_2 \\ \hat{y}_2 \\ \vdots \\ \hat{x}_N \\ \hat{y}_N \end{bmatrix}$$

by use of the temporal filter state vector, where:

$$\begin{bmatrix} \hat{x}_1 \\ \hat{y}_1 \\ \hat{x}_2 \\ \hat{y}_2 \\ \vdots \\ \hat{x}_N \\ \hat{y}_N \end{bmatrix} = \begin{bmatrix} 1 & 0 & 0 & 0 & & \\ 0 & 0 & 1 & 0 & 0 & \\ 0 & 0 & 1 & 0 & \ldots & \ldots \\ 0 & 0 & 0 & 1 & & \\ & & \vdots & & & \\ & & \vdots & & & \end{bmatrix} \begin{bmatrix} \hat{\omega} \\ \widehat{v_{x0}} \\ \widehat{v_{y0}} \\ \widehat{x_1} \\ \widehat{y_1} \\ \widehat{x_2} \\ \widehat{y_2} \\ \vdots \\ \widehat{x_N} \\ \widehat{y_N} \end{bmatrix}$$

where $x_1 \ldots x_N$ is an x-coordinate for each feature point position, $y_1 \ldots y_N$ is a y-coordinate for each feature point position, $\hat{x}_1 \ldots \hat{x}_N$ is a predicted x-coordinate for each feature point position, $\hat{y}_1 \ldots \hat{y}_N$ is a predicted y-coordinate for each feature point position, $\tilde{x}_1 \ldots \tilde{x}_N$ is a measured x-coordinate for each feature point position, $\tilde{y}_1 \ldots \tilde{y}_N$ is a measured y-coordinate for each feature point position, $\omega$ is an angular velocity of the target object, $v_{x0}$ is a velocity x-component for a reference velocity vector $v_{r0}$, $v_{y0}$ is a velocity y-component for the reference velocity vector $v_{r0}$, where all coordinates are determined relative a coordinate system 10 having an x-axis 14 and a y-axis 15, where the processing unit 5 is arranged to form an updated temporal filter state vector by use of the feature point vector and the predicted feature point vector.

According to an example, the processing unit 5 is arranged to exclude feature positions that are determined to move relative to the object 11 from the temporal filter update vector.

According to an example, the processing unit 5 is arranged to assume that only linear motion is present and to set the angular velocity $\omega$ to 0.

According to an example, the vehicle environment detection system 2 includes a radar sensor arrangement 3 that is arranged to provide radial detected Doppler velocity components $v_{D1}$, $v_{D2}$ and corresponding azimuth detection angles $\theta_1$, $\theta_2$, where the processing unit 5 is arranged to calculate a velocity vector $v_{Sr}$ of the object 11 at the radar sensor arrangement position $x_S$, $y_S$ by use of the detected Doppler velocity components $v_{D1}$, $v_{D2}$ and corresponding azimuth detection angles $\theta_1$, $\theta_2$, where the processing unit 5 is arranged to integrate the velocity vector $v_{Sr}$ in the measurement vector such that the calculation accuracy of the velocity vector $v_{r0}$ and yaw rate $\omega$ is improved.

Generally, the present disclosure also relates to a method for determining a common motion state for at least one object 11 outside a vehicle 1, where the method includes the steps of:

Step 17: detecting at least two feature points 12, 13 at objects 11 outside a vehicle 1, where each feature point constitutes a retrievable point that has a fixed position $x_1$, $y_1$; $x_2$, $y_2$ on the object 11;

Step 18: determining the positions $x_1$, $y_1$; $x_2$, $y_2$ and resulting velocities $v_{r1}$, $v_{r2}$ for each one of the feature points 12, 13 for multiple frames by use of a feature point tracker; and Step 19: determining a reference position $x_0$, $y_0$, a corresponding reference velocity $v_{r0}$ and reference angular velocity $\omega$, constituting a common motion state for the object 11, using the results from the feature point tracker;
where a feature point tracker is constituted by a tracking algorithm which is arranged to track multiple features and which includes temporal filtering.

According to an example, the method includes transforming the reference velocity vector $v_{r0}$ to desired positions.

According to an example, the method includes calculating the common motion state by solving the linear equation system:

$$\begin{bmatrix} v_{x1} \\ v_{y1} \\ v_{x2} \\ v_{y2} \\ \vdots \\ v_{xN} \\ v_{yN} \end{bmatrix} = \begin{bmatrix} -y_1 + y_0 & 1 & 0 \\ x_1 - x_0 & 0 & 1 \\ -y_2 + y_0 & 1 & 0 \\ x_2 - x_0 & 0 & 1 \\ \vdots & & \\ -y_N + y_0 & 1 & 0 \\ x_N - x_0 & 0 & 1 \end{bmatrix} \begin{bmatrix} \omega \\ v_{x0} \\ v_{y0} \end{bmatrix}$$

where $v_{x1} \ldots v_{xN}$ are determined velocity x-components for each feature point 12, 13, $v_{y1} \ldots v_{yN}$ are determined velocity y-components for each feature point 12, 13, $x_1 \ldots x_N$ is an x-coordinate for each feature point position, $y_1 \ldots y_N$ is a y-coordinate for each feature point position, $v_{x0}$ is a velocity x-component for the reference velocity vector $v_{r0}$, $v_{y0}$ is a velocity y-component for the reference velocity vector $v_{r0}$, $x_0$ is a reference position x-coordinate and $y_0$ is a reference position y-coordinate, where all coordinates are determined relative a coordinate system 10 having an x-axis 14 and a y-axis 15.

Generally, the present disclosure also relates to a method for determining a common motion state for at least one object 11 outside a vehicle 1, where the method includes the steps of:

Step 20: detecting at least two feature points 12, 13 at objects 11 outside a vehicle 1 in at least two consecutive frames, where each feature point constitutes a retrievable point that has a fixed position $x_1$, $y_1$; $x_2$, $y_2$ on the object 11;

Step 21: for each feature point 12, 13, obtaining the position $x_1$, $y_1$; $x_2$, $y_2$;

Step 22: forming a measurement vector from the feature points according to:

$$\begin{bmatrix} \tilde{x_1} \\ \tilde{y_1} \\ \tilde{x_2} \\ \tilde{y_2} \\ \vdots \\ \tilde{x_N} \\ \tilde{y_N} \end{bmatrix}$$

Step 23: forming a temporal filter state vector according to:

$$\begin{bmatrix} \omega \\ v_{x0} \\ v_{y0} \\ x_1 \\ y_1 \\ x_2 \\ y_2 \\ \vdots \\ x_N \\ y_N \end{bmatrix}$$

and

Step 24: forming a predicted feature point vector for the update step according to:

$$\begin{bmatrix} \hat{x}_1 \\ \hat{y}_1 \\ \hat{x}_2 \\ \hat{y}_2 \\ \vdots \\ \hat{x}_N \\ \hat{y}_N \end{bmatrix}$$

by use of the temporal filter state vector, where:

$$\begin{bmatrix} \hat{x}_1 \\ \hat{y}_1 \\ \hat{x}_2 \\ \hat{y}_2 \\ \vdots \\ \hat{x}_N \\ \hat{y}_N \end{bmatrix} = \begin{bmatrix} 1 & 0 & 0 & 0 & & \\ 0 & 0 & 1 & 0 & 0 & \\ 0 & 0 & 1 & 0 & \cdots & \cdots \\ 0 & 0 & 0 & 1 & & \\ & & \vdots & & & \\ & & \vdots & & & \end{bmatrix} \begin{bmatrix} \hat{\omega} \\ \widehat{v_{x0}} \\ \widehat{v_{y0}} \\ \widehat{x_1} \\ \widehat{y_1} \\ \widehat{x_2} \\ \widehat{y_2} \\ \vdots \\ \widehat{x_N} \\ \widehat{y_N} \end{bmatrix}$$

where $x_1 \ldots x_N$ is an x-coordinate for each feature point position, $y_1 \ldots y_N$ is a y-coordinate for each feature point position, $\hat{x}_1 \ldots \hat{x}_N$ is a predicted x-coordinate for each feature point position, $\hat{y}_1 \ldots \hat{y}_N$ is a predicted y-coordinate for each feature point position, $\tilde{x}_1 \ldots \tilde{x}_N$ is a measured x-coordinate for each feature point position, $\tilde{y}_1 \ldots \tilde{y}_N$ is a measured y-coordinate for each feature point position, $\omega$ is an angular velocity of the target object, $v_{x0}$ is a velocity x-component for a reference velocity vector $v_{r0}$, $v_{y0}$ is a velocity y-component for the reference velocity vector $v_{r0}$, where all coordinates are determined relative a coordinate system 10 having an x-axis 14 and a y-axis 15, where the processing unit 5 is arranged to form an updated temporal filter state vector by use of the feature point vector and the predicted feature point vector.

According to an example, the method includes excluding feature positions that are determined to move relative to the object 11 from the temporal filter update vector.

The invention claimed is:

1. A vehicle environment detection system that comprises, at least one detection device and at least one processing unit, where the vehicle environment detection system is arranged to detect at least two feature points at objects outside a vehicle, where each of the at least two feature points constitutes a retrievable point that has a position $(x_1, y_1; x_2, y_2)$ on the object, the processing unit is arranged to:
   determine the positions $(x_1, y_1; x_2, y_2)$ and resulting velocities $(v_{r1}, v_{r2})$ for each one of the at least two feature points for multiple frames by use of a feature point tracker; and
   determine a reference position $(x_0, y_0)$, a corresponding reference velocity $(v_{r0})$ and a reference angular velocity $(\omega)$, constituting a common motion state for the object, by use of results from the feature point tracker;
   where the feature point tracker is constituted by a tracking algorithm which is arranged to track multiple of the feature points and which comprises temporal filtering;
   wherein the vehicle environment detection system is arranged to calculate the common motion state by solving a linear equation system:

$$\begin{bmatrix} v_{x1} \\ v_{y1} \\ v_{x2} \\ v_{y2} \\ \vdots \\ v_{xN} \\ v_{yN} \end{bmatrix} = \begin{bmatrix} -y_1 + y_0 & 1 & 0 \\ x_1 - x_0 & 0 & 1 \\ -y_2 + y_0 & 1 & 0 \\ x_2 - x_0 & 0 & 1 \\ \vdots & & \\ -y_N + y_0 & 1 & 0 \\ x_N - x_0 & 0 & 1 \end{bmatrix} \begin{bmatrix} \omega \\ v_{x0} \\ v_{y0} \end{bmatrix}$$

where $v_{x1} \ldots v_{xN}$ are determined velocity x-components for each of the at least two feature points, $v_{y1} \ldots v_{yN}$ are determined velocity y-components for each of the at least two feature points, $x_1 \ldots x_N$ is an x-coordinate for each of the feature point positions, $y_1 \ldots y_N$ is a y-coordinate for each feature of the at least two point positions, $v_{x0}$ is a velocity x-component for a reference velocity vector $(v_{r0})$, $v_{y0}$ is a velocity y-component for the reference velocity vector $(v_{r0})$, $x_0$ is a reference position x-coordinate and $y_0$ is a reference position y-coordinate, where all the coordinates are determined relative a coordinate system having an x-axis and a y-axis.

2. The vehicle environment detection system according to claim 1, wherein the feature point tracker comprises a Kalman filter.

3. The vehicle environment detection system according to claim 1, further comprising, the processing unit is arranged to transform the reference velocity vector $(v_{r0})$ to desired positions.

4. The vehicle environment detection system according to claim 3, further comprising, the processing unit is arranged to transform the reference velocity vector $(v_{r0})$ to the positions of the feature points, and to correct the resulting velocities $(v_{r1}, v_{r2})$ of the feature points.

5. The vehicle environment detection system according to claim 1, wherein the vehicle environment detection system comprises a radar sensor arrangement that is arranged to provide radial detected Doppler velocity components $(v_{D1}, v_{D2})$ and corresponding azimuth detection angles $(\theta_1, \theta_2)$, where the processing unit is arranged to calculate a velocity vector $(v_{Sr})$ of the object at the radar sensor arrangement position $(x_S, y_S)$ by use of the detected Doppler velocity components $(v_{D1}, v_{D2})$ and corresponding azimuth detection angles $(\theta_1, \theta_2)$, where the processing unit is arranged to apply the velocity vector $(v_{Sr})$ to the linear equation system such that the calculation accuracy of the velocity vector $(v_{r0})$ and yaw rate $(\omega)$ is improved.

6. A method for determining a common motion state for at least one object outside a vehicle, where the method comprises the steps of:
   detecting at least two feature points at objects outside a vehicle, where each of the at least two feature point constitutes a retrievable point that has a fixed position $(x_1, y_1; x_2, y_2)$ on the object;
   determining the positions $(x_1, y_1; x_2, y_2)$ and resulting velocities $(v_{r1}, v_{r2})$ for each one of the at least two feature points for multiple frames by using a feature point tracker; and
   determining a reference position $(x_0, y_0)$, a corresponding reference velocity $(v_{r0})$ and reference angular velocity $(\omega)$, constituting the common motion state for the object, using the results from the feature point tracker;
   where the feature point tracker is constituted by a tracking algorithm which is arranged to track multiple features and which comprises temporal filtering;
   calculating the common motion state by solving a linear equation system:

$$\begin{bmatrix} v_{x1} \\ v_{y1} \\ v_{x2} \\ v_{y2} \\ \vdots \\ v_{xN} \\ v_{yN} \end{bmatrix} = \begin{bmatrix} -y_1 + y_0 & 1 & 0 \\ x_1 - x_0 & 0 & 1 \\ -y_2 + y_0 & 1 & 0 \\ x_2 - x_0 & 0 & 1 \\ \vdots & & \\ -y_N + y_0 & 1 & 0 \\ x_N - x_0 & 0 & 1 \end{bmatrix} \begin{bmatrix} \omega \\ v_{x0} \\ v_{y0} \end{bmatrix}$$

where $v_{x1} \ldots v_{xN}$ are determined velocity x-components for each of the at least two feature points, $v_{y1} \ldots v_{yN}$ are determined velocity y-components for each of the at least two feature points, $x_1 \ldots x_N$ is an x-coordinate for each of the feature point positions, $y_1 \ldots y_N$ is a y-coordinate for each feature of the at least two point positions, $v_{x0}$ is a velocity x-component for a reference velocity vector ($v_{r0}$), $v_{y0}$ is a velocity y-component for the reference velocity vector ($v_{r0}$), $x_0$ is a reference position x-coordinate and $y_0$ is a reference position y-coordinate, where all the coordinates are determined relative a coordinate system having an x-axis and a y-axis.

7. The method according to claim 6, wherein the method further comprises transforming the reference velocity vector ($v_{r0}$) to desired positions.

\* \* \* \* \*